(12) United States Patent
Becker et al.

(10) Patent No.: US 7,367,712 B2
(45) Date of Patent: May 6, 2008

(54) RTD MEASUREMENT UNIT INCLUDING DETECTION MECHANISM FOR AUTOMATIC SELECTION OF 3-WIRE OR 4-WIRE RTD MEASUREMENT MODE

(75) Inventors: Alvin G. Becker, Austin, TX (US);
Alisa T. Gartner, Austin, TX (US)

(73) Assignee: National Instruments Corporation, Austin, TX (US)

( * ) Notice: Subject to any disclaimer, the term of this patent is extended or adjusted under 35 U.S.C. 154(b) by 96 days.

(21) Appl. No.: 11/348,218

(22) Filed: Feb. 6, 2006

(65) Prior Publication Data
US 2007/0183478 A1    Aug. 9, 2007

(51) Int. Cl.
*G01K 7/16* (2006.01)
*G01K 1/12* (2006.01)

(52) U.S. Cl. .............. 374/185; 374/163; 327/512; 702/130; 338/13

(58) Field of Classification Search ............... None
See application file for complete search history.

(56) References Cited

U.S. PATENT DOCUMENTS

| | | | |
|---|---|---|---|
| 4,102,199 A | | 7/1978 | Tsipouras |
| 5,083,288 A | * | 1/1992 | Somlyody et al. ......... 702/116 |
| 5,282,685 A | * | 2/1994 | Koegler ..................... 374/172 |
| 5,317,520 A | * | 5/1994 | Castle ........................ 702/58 |
| 5,929,344 A | * | 7/1999 | Hays et al. ............. 73/861.357 |
| 6,045,260 A | * | 4/2000 | Schwartz et al. ........... 374/183 |
| 6,190,040 B1 | * | 2/2001 | Renken et al. .............. 374/185 |
| 6,244,744 B1 | | 6/2001 | Calvin |
| 6,594,603 B1 | * | 7/2003 | Eryurek et al. ............ 702/104 |
| 6,655,835 B2 | | 12/2003 | Mattoon et al. |
| 6,754,601 B1 | * | 6/2004 | Eryurek et al. ............ 702/104 |
| 6,910,804 B2 | | 6/2005 | Mattoon et al. |
| 7,223,014 B2 | * | 5/2007 | Lojen ........................ 374/120 |
| 7,228,186 B2 | * | 6/2007 | Karschnia et al. ........... 700/19 |
| 2005/0288799 A1 | * | 12/2005 | Brewer et al. ................ 700/1 |
| 2006/0161271 A1 | * | 7/2006 | Kirkpatrick et al. ......... 700/27 |

FOREIGN PATENT DOCUMENTS

JP    2004028612 A    *    1/2004

OTHER PUBLICATIONS

"Measuring Temperature with an RTD or Thermistor"; Application Note 046; Apr. 2003; 8 pages; National Instruments Corporation; Austin, TX.

* cited by examiner

*Primary Examiner*—Gail Verbitsky
(74) *Attorney, Agent, or Firm*—Meyertons Hood Kivlin Kowert & Goetzel, P.C.; Jeffrey C. Hood (57) ABSTRACT

An RTD measurement device including a mechanism for automatic selection of a 3-wire or 4-wire configuration mode of operation. The RTD measurement device may include detection circuitry to detect whether an RTD connected to the RTD measurement device via a plurality of wire connections includes a 3-wire configuration or a 4-wire configuration. The RTD measurement device may include processing circuitry to process one or more readings from the RTD. If a 3-wire configuration is detected, the detection circuitry may automatically configure the processing circuitry to operate in a 3-wire configuration mode. If a 4-wire configuration is detected, the detection circuitry may automatically configure the processing circuitry to operate in a 4-wire configuration mode.

25 Claims, 5 Drawing Sheets

RTD MEASUREMENT UNIT INCLUDING DETECTION MECHANISM FOR AUTOMATIC SELECTION OF 3-WIRE OR 4-WIRE RTD MEASUREMENT MODE

BACKGROUND OF THE INVENTION

1. Field of the Invention

This invention relates to temperature measurement systems and, more particularly, to resistance temperature device (RTD) measurement mechanisms.

2. Description of the Related Art

Resistance temperature devices or detectors (RTDs) are temperature-sensing devices whose resistance increases with temperature. RTDs typically consist of a wire coil or a deposited film of pure metal. RTDs are known for their excellent accuracy over a wide temperature range. Since RTDs are resistive devices, an RTD measurement device drives a current through the RTD and measures the resulting voltage to determine the temperature associated with an RTD.

Two of the most widely used RTDs have a 3-wire or a 4-wire configuration. If a device under test (DUT) includes an RTD with a 3-wire configuration, an RTD measurement unit configured to operate in a 3-wire RTD mode is usually required. Similarly, if a DUT includes an RTD with a 4-wire configuration, an RTD measurement unit configured to operate in a 4-wire RTD mode is typically required. Alternatively, some RTD measurement units are configurable via software to operate in either a 3-wire RTD mode or a 4-wire RTD mode. However, these configurable RTD measurement units require a user to manually configure the device to operate in one of the two RTD modes.

SUMMARY OF THE INVENTION

Various embodiments are disclosed of an RTD measurement device including a mechanism for automatically selecting a 3-wire or a 4-wire mode of operation. The RTD measurement device may include detection circuitry to detect whether an RTD connected to the RTD measurement device via a plurality of wire connections includes a 3-wire configuration or a 4-wire configuration. The RTD measurement device may include processing circuitry to process one or more readings from the RTD. If a 3-wire configuration is detected, the detection circuitry may automatically configure the processing circuitry to operate in a 3-wire configuration mode. If a 4-wire configuration is detected, the detection circuitry may automatically configure the processing circuitry to operate in a 4-wire configuration mode.

In one embodiment, the RTD measurement device may include a resistive element connected between a first terminal and a second terminal of the RTD measurement device. The detection circuitry may detect a voltage drop across the resistive element to determine whether the RTD includes a 3-wire configuration or a 4-wire configuration. The detection circuitry may control a switching mechanism for configuring the processing circuitry to operate in either a 3-wire configuration mode or a 4-wire configuration mode based on the detected RTD configuration. If the detected voltage drop across the resistive element is above a predetermined threshold, the detection circuitry configures the processing circuitry to operate in a 3-wire configuration mode. If the detected voltage drop across the resistive element is below the predetermined threshold, the detection circuitry configures the processing circuitry to operate in a 4-wire configuration mode.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 1:
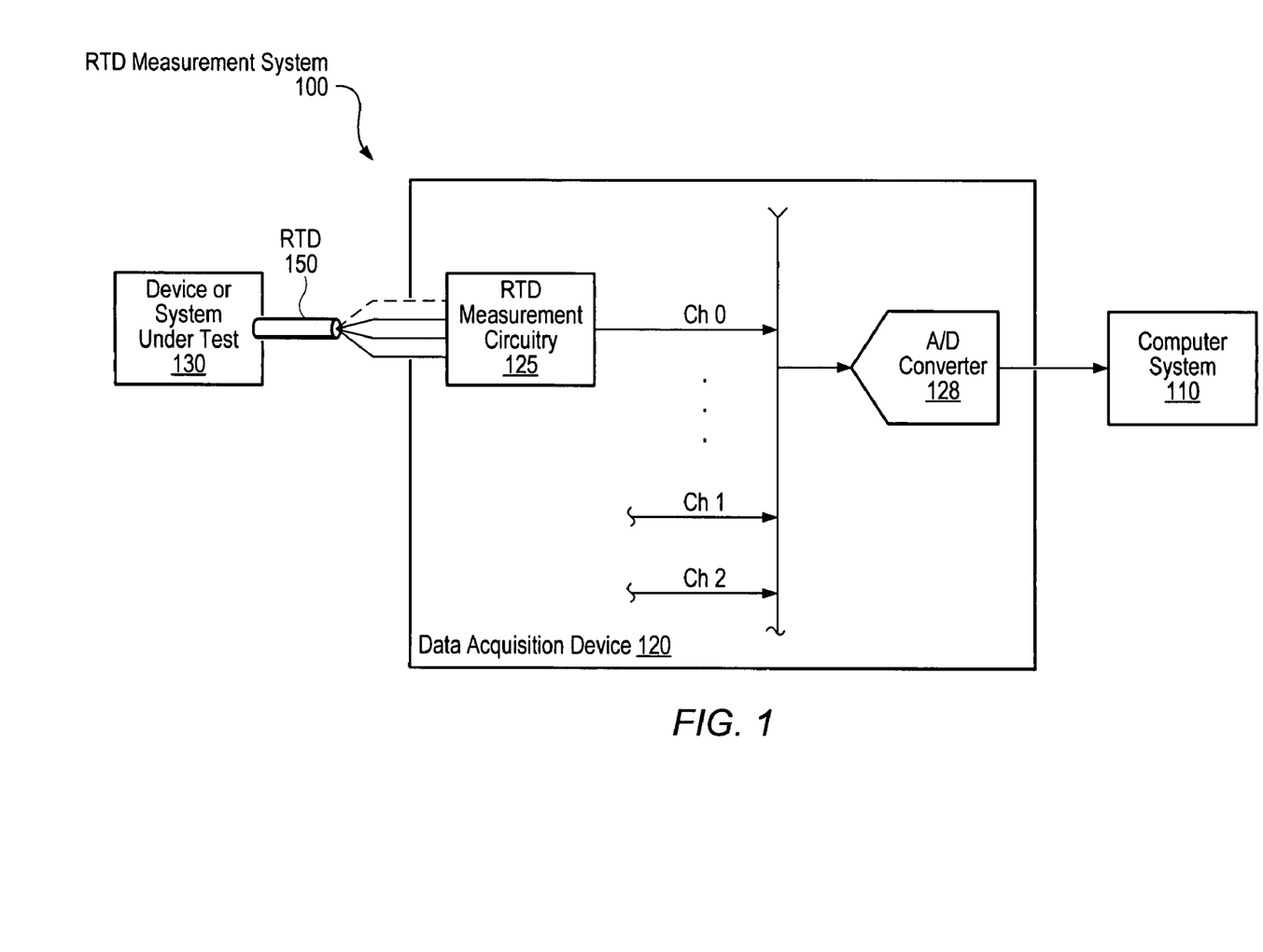
FIG. 1 is a block diagram of one embodiment of an RTD measurement system.

FIG. 1 is a block diagram of one embodiment of an RTD measurement system 100. As illustrated, the RTD measurement system 100 may include a computer system 110, a data acquisition device 120, and a device or system under test 130. Device or system under test 130 includes at least one RTD 150. Data acquisition device 120 monitors the temperature of device or system under test 130 via RTD 150 and provides the temperature readings to computer system 110 for further processing and analysis purposes. Computer system 110 may include one or more data acquisition devices for monitoring the temperature of one or more devices or systems under test. Temperature monitoring using RTDs may be implemented in various applications, such as automotive testing, laboratory automation, process monitoring, manufacturing tests, calibration, and furnace control.

Data acquisition device 120 may be a card or board configured to be plugged into one of the I/O slots of computer system 110. It is noted however that in other embodiments data acquisition device 120 may be connected external to computer system 110. Data acquisition device 120 may include an RTD measurement unit 125 and an analog-to-digital converter (ADC) 128. Data acquisition device 120 may include one or more channels (e.g., CH0-CH2), each including an RTD measurement unit and a corresponding ADC. It is noted, however, that in some embodiments data acquisition device 120 may include other processing circuitry instead of or in addition to the ADC 128. RTD measurement unit 125 includes detection circuitry to detect the configuration of RTD 150 and configure RTD measurement unit 125 accordingly to process readings received from RTD 150.

Computer system 110 may be any of various types of computing or processing systems, including a personal computer system (PC), mainframe computer system, server system including a plurality of server blades, workstation, instrumentation chassis, network appliance, Internet appliance, personal digital assistant (PDA), or other device or combinations of devices. It is noted however that computer system 110 may be other types of systems or devices including at least one RTD measurement device, e.g., RTD measurement unit 125.

Figure 2:
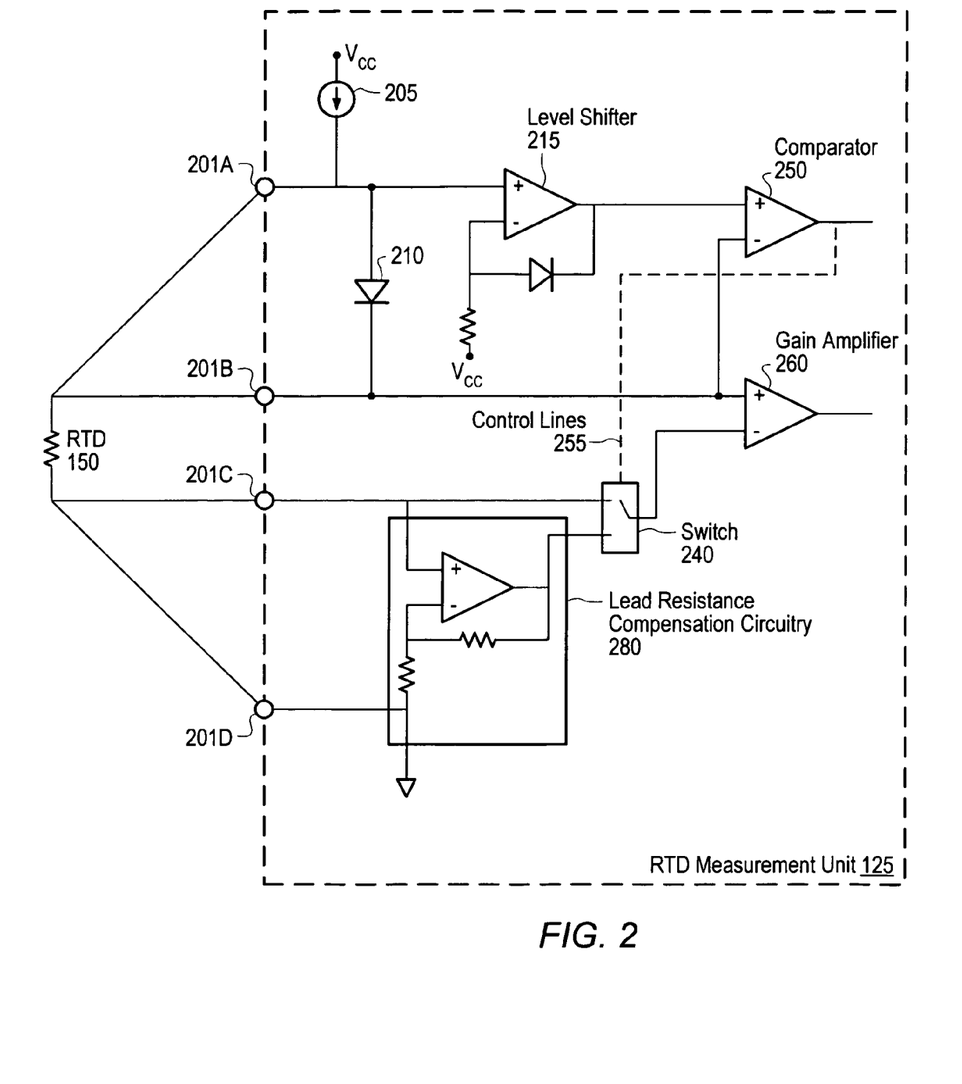
FIG. 2 is a circuit diagram of one embodiment of an RTD measurement unit.

FIG. 2 is a circuit diagram of one embodiment of RTD measurement unit 125. RTD measurement unit 125 may be an integrated circuit (IC), e.g., a mixed-signal IC. RTD measurement unit 125 may be included in systems or devices used for measuring RTDs, e.g., data acquisition device 120 of FIG. 1.

RTD measurement unit 125 may include an excitation source 205, terminals 201A-201D, one or more resistive elements, detection circuitry, a switching mechanism, and processing circuitry. As illustrated in the embodiment of FIG. 2, the resistive element may be a diode 210, the detection circuitry may be a level shifter 215 and a comparator 250, the switching mechanism may be a switch 240, and the processing circuitry may be lead resistance compensation circuitry 280 and a gain amplifier 260. As shown, diode 210 may be connected between terminals 201A and 201B. Terminal 201A may be connected to a first input terminal of comparator 250 and to excitation source 205, and terminal 201B may be connected to a second input terminal of comparator 250. Terminal 201C may be connected to a first input terminal of lead resistance compensation circuitry 280, and terminal 201D may be connected to a second input terminal of lead resistance compensation circuitry 280. Terminal 201B may be connected to a first input terminal of gain amplifier 260. Switch 240 may be connected to a second input terminal of gain amplifier 260, to an output terminal of lead resistance compensation circuitry 280, and to terminal 201C.

As described previously, RTD measurement unit 125 may be connected to RTD 150 to process temperature readings received from RTD 150. As illustrated, RTD 150 may include a 3-wire or a 4-wire configuration for interfacing with the RTD measurement unit 125. When RTD 150 is connected to RTD measurement unit 125, comparator 250 may detect whether the RTD includes a 3-wire configuration or a 4-wire configuration.

As illustrated in the embodiment of FIG. 2, when RTD 150 has a 3-wire configuration, terminal 201A of RTD measurement unit 125 will be open since RTD 150 will not have a 4$^{th}$ wire. During operation, since terminal 201A is not connected to RTD 150, the current provided by the excitation source 205 will flow through diode 210. In some embodiments, the current provided by excitation source 205 may be a precision current. Comparator 250 may detect the voltage drop across diode 210, e.g., 0.7V drop. When RTD 150 has a 4-wire configuration, terminal 201A will be connected to RTD 150 via a 4$^{th}$ wire. Since the 4$^{th}$ wire results in a short between terminal 201A and RTD 150, the current provided by excitation source 205 will flow directly to RTD 150 via terminal 201A. Therefore, since diode 210 will not be forward-biased, comparator 250 may detect a 0V drop across diode 210 or at least a very low voltage drop.

Comparator 250 may determine whether RTD 150 includes a 3-wire configuration or a 4-wire configuration based on the detected voltage drop across diode 210. In one embodiment, comparator 250 may compare the detected voltage drop to a reference voltage, e.g., 0.35V. If the detected voltage drop is above the reference voltage, then RTD 150 is in a 3-wire configuration, and if the detection voltage is below the reference voltage, then RTD 150 is in a 4-wire configuration. In this case, when the detected voltage drop is approximately 0.7V, comparator 250 may switch to a first state (e.g., outputs a logic "1"), and when the detected voltage drop is approximately 0V, comparator 250 may switch to a second state (e.g., outputs a logic "0").

In various embodiments, comparator 250 may have trouble detecting a very low voltage drop, e.g., a voltage drop of 0V. Comparator 250 may have no trouble reading a voltage drop of approximately 0.7V; however, a voltage drop of approximately 0V may be very close to the comparator threshold, and uncertainty may be introduced into the behavior of comparator 250. In these embodiments, level shifter 215 may be connected between comparator 250 and terminal 201A. Level shifter 215 may shift the detected voltage drop a predetermined amount to prevent this unwanted behavior. For example, the level shifter 215 may reduce the measurements by 0.3V. In this example, instead of detecting a 0.7V drop, comparator 250 would detect a 0.4V drop, and instead of detecting a 0V drop, comparator 250 would detect a −0.3V drop. It is typically easier for comparator 250 to detect −0.3V drop than a 0V drop. In some embodiments, if RTD measurement unit 125 includes level shifter 215, the reference voltage associated with comparator 250 may be adjusted accordingly to perform the compare operation. It is noted that in other embodiments the level shifting function may be performed by other methods. It is further noted that the predetermined amount of voltage shifting may be programmable.

When comparator 250 detects a 3-wire configuration, comparator 250 automatically configures the processing circuitry (i.e., lead resistance compensation circuitry 280 and a gain amplifier 260) to operate in a 3-wire configuration mode. More specifically, comparator 250 controls the state of switch 240 via control line 255 to configure the processing circuitry to operate in a 3-wire configuration mode. In a 3-wire configuration mode, comparator 250 places switch 240 in a second position to connect lead resistance compensation circuitry 280 to gain amplifier 260.

During the 3-wire configuration mode, the current from excitation source 205 flows down through diode 210 and out to RTD 150 via terminal 201B. In the 3-wire configuration, there is typically a lead resistance error introduced into the measurements. The wires used to interface with RTD measurement unit 125 have some inherent resistance. This resistance causes a voltage drop in the wiring, which is translated to the measurements as an error voltage. In one embodiment, the error voltage resulting from the wiring connected between RTD 150 and terminal 201B may be approximately the same as the error voltage introduced by the wiring connected between RTD 150 and terminal 201D. Lead resistance compensation circuitry 280 may add the error signal associated with terminal 201D to terminal 201C to generate an approximately equal error signal compared to the error signal in terminal 201B, which may be processed as a common-mode signal by gain amplifier 260. Gain amplifier 260 may remove the error voltage from the measurement by rejecting the common-mode signal, and may detect the voltage drop across RTD 150 to determine the temperature associated with RTD 150. It is noted, however, that in other embodiments the lead resistance compensation function may be performed by other mechanisms, e.g., as described below with reference to FIG. 5.

When comparator 250 detects a 4-wire configuration, comparator 250 automatically configures the processing circuitry to operate in a 4-wire configuration mode. More specifically, comparator 250 controls the state of switch 240 via control line 255 to configure the processing circuitry to operate in a 4-wire configuration mode. In a 4-wire configuration mode, comparator 250 places switch 240 in a first position to bypass lead resistance compensation circuitry 280 and connect terminal 201C directly to gain amplifier 260.

During the 4-wire configuration mode, the current from excitation source 205 flows through terminal 201A and out to RTD 150 via the $4^{th}$ wire. Gain amplifier 260 then detects the voltage drop across RTD 150 through terminals 201B and 201C. It is noted, however, that in other embodiments the functionality associated with comparator 250 may be performed by other mechanisms. It is further noted that in some embodiments other conditioning devices instead of or in addition to gain amplifier 260 may detect the voltage drop across RTD 150.

Figure 3:
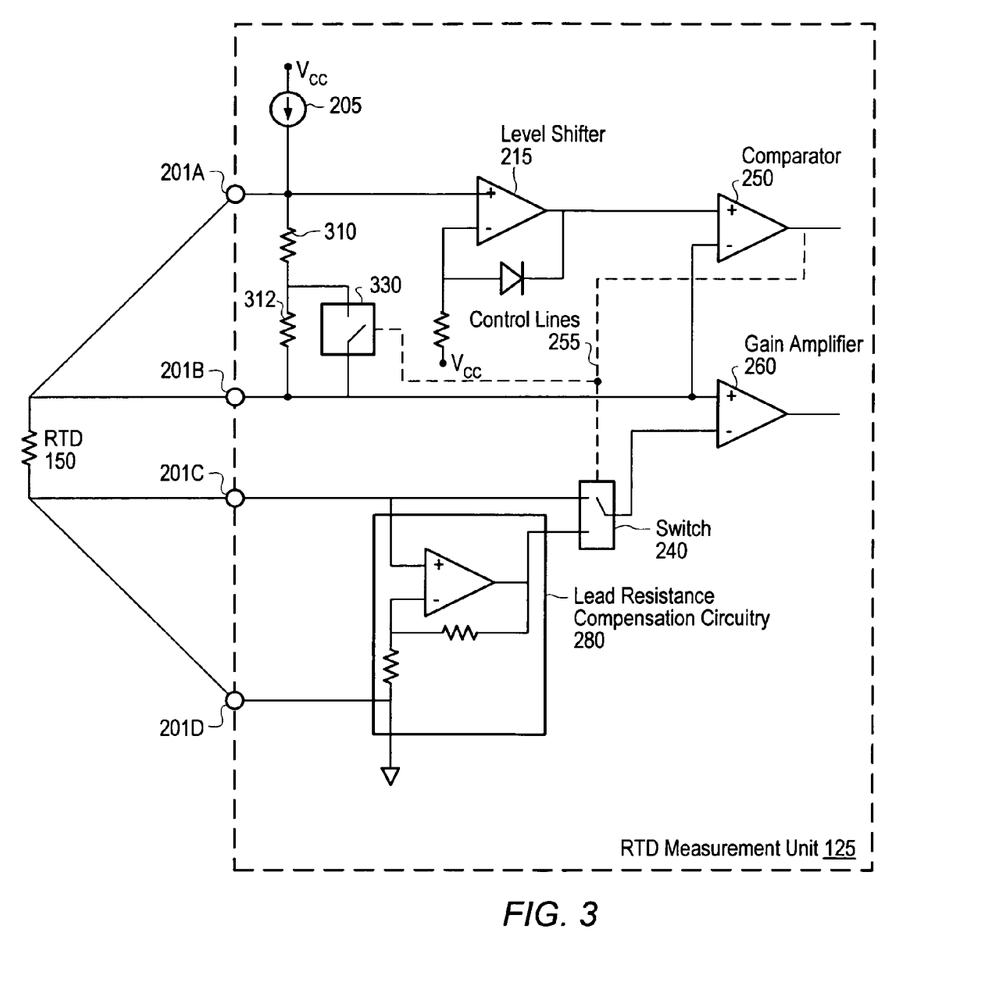
FIG. 3 is a circuit diagram of another embodiment of an RTD measurement unit.

FIG. 3 is a circuit diagram of another embodiment of RTD measurement unit 125. Components that correspond to those shown in the embodiment of FIG. 2 are numbered identically for simplicity and clarity. RTD measurement unit 125 may include an excitation source 205, terminals 201A-201D, one or more resistive elements, detection circuitry, a switching mechanism, and processing circuitry. As depicted in the embodiment of FIG. 3, the resistive elements may be resistors 310 and 312, the detection circuitry may be level shifter 215 and comparator 250, the switching mechanism may be switches 330 and 240, and the processing circuitry may be lead resistance compensation circuitry 280 and a gain amplifier 260.

When RTD 150 has a 3-wire configuration, the current provided by the excitation source 205 will flow through resistor 310 and switch 330 or resistors 310 and 312, depending on the previous state of switch 330, i.e., whether switch 330 is open or closed. Comparator 250 detects the voltage drop across the resistive element(s). When RTD 150 has a 4-wire configuration, the current provided by excitation source 205 will flow directly to RTD 150 via terminal 201A. Therefore, comparator 250 may detect a 0V drop across the resistive element(s) or at least a very low voltage drop. Comparator 250 may determine whether RTD 150 includes a 3-wire configuration or a 4-wire configuration by detecting the voltage drop across the resistive element(s). In one embodiment, comparator 250 may compare the detected voltage drop to a reference voltage, e.g., 0.5V. If the detected voltage drop is above the reference voltage, then RTD 150 is in a 3-wire configuration, and if the detection voltage is below the reference voltage, then RTD 150 is in a 4-wire configuration. The value of resistor 310 is typically chosen to provide a voltage drop in the 3-wire configuration that is easily detected by comparator 250.

Similar to the embodiment shown in FIG. 2, in some embodiments, comparator 250 of FIG. 3 may have trouble detecting a very low voltage drop, e.g., a voltage drop of 0V. In these embodiments, level shifter 215 may be connected between comparator 250 and terminal 201A. Level shifter 215 may shift the detected voltage drop a predetermined amount, for example, the level shifter 215 may reduce the measurements by 0.7V.

When comparator 250 detects a 3-wire configuration, comparator 250 automatically configures the processing circuitry (i.e., lead resistance compensation circuitry 280 and a gain amplifier 260) to operate in a 3-wire configuration mode. More specifically, comparator 250 controls the state of switches 240 and 330 via control line 255 to configure the processing circuitry to operate in a 3-wire configuration mode. In a 3-wire configuration mode, comparator 250 places switch 240 in a second position to connect lead resistance compensation circuitry 280 to gain amplifier 260, and closes switch 330. Switch 330 provides a low impedance path from excitation source 205 to terminal 201B. As was described above, lead resistance compensation circuitry 280 may cancel a lead resistance error associated with a 3-wire configuration.

When comparator 250 detects a 4-wire configuration, comparator 250 automatically configures the processing circuitry to operate in a 4-wire configuration mode. More specifically, comparator 250 controls the state of switches 240 and 330 via control line 255 to configure the processing circuitry to operate in a 4-wire configuration mode. In a 4-wire configuration mode, comparator 250 places switch 240 in a first position to bypass lead resistance compensation circuitry 280 and connect terminal 201C directly to gain amplifier 260, and opens switch 330 to eliminate error due to current leaking from terminal 201A to terminal 201B.

It should be noted that the components described with reference to FIGS. 2 and 3 are meant to be exemplary only, and are not intended to limit the invention to any specific set of components or configurations. For example, in various embodiments, one or more of the components described may be omitted, combined, modified, or additional components included, as desired. For instance, in other embodiments, RTD measurement unit 125 may include a different number of terminals 201 and RTD 150 may include a different number of wire connections for interfacing with RTD measurement unit 125. In some embodiments, RTD measurement unit 125 may be further configured to communicate information indicating whether RTD 150 includes a 3-wire or 4-wire configuration to a computer system, management entity, and/or a user.

Figure 4:
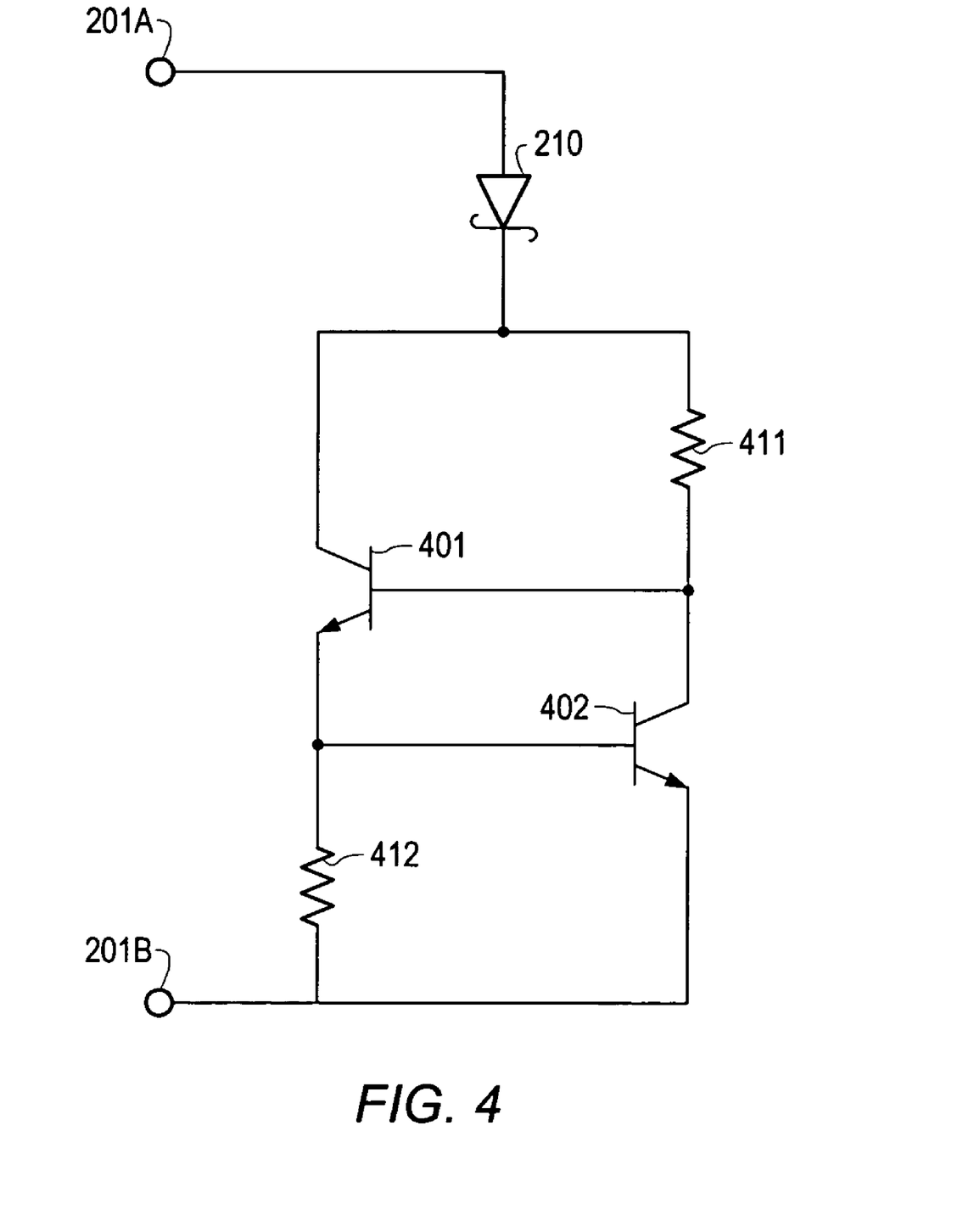
FIG. 4 is a circuit diagram of one embodiment of a diode and protection circuitry for use in an RTD measurement unit.

FIG. 4 is a circuit diagram of one embodiment of a diode and protection circuitry for use in an RTD measurement unit, e.g., RTD measurement unit 125. In one embodiment, as illustrated in FIG. 4, the protection circuitry may include a transistor 401, a transistor 402, a resistor 411, and a resistor 412. The protection circuitry may be connected to diode 210 (e.g., diode 210 of FIG. 2) to provide over-voltage protection for the RTD measurement unit 125.

During operation, the current provided by excitation source 205 may travel through the diode 210 (e.g., a Schottky diode) and down through transistor 401 and resistor 412. In one example, resistor 411 may be 10 kΩ and resistor 412 may be 270Ω. The resistance associated with resistor 412 may be relatively small so that the voltage drop across it during normal operation is less than the base-emitter voltage of transistor 402. This keeps transistor 402 off, which may prevent current from flowing through resistor 411 and transistor 402. When a relatively high voltage (e.g., +30V) is applied across this circuit, the current going through resistor 412 rises and is limited by the base-emitter voltage of transistor 402. At this point, transistor 402 is turned on and current flows through resistor 411. Since transistor 401, transistor 402, and diode 210 are on, the majority of the high voltage should drop across resistor 411. Resistor 411 may have a large resistance value to limit the current through the circuit. In one embodiment, a Schottky or other diode 210 may be used in this topology to provide under-voltage protection for the circuit (e.g., −30V).

Figure 5:
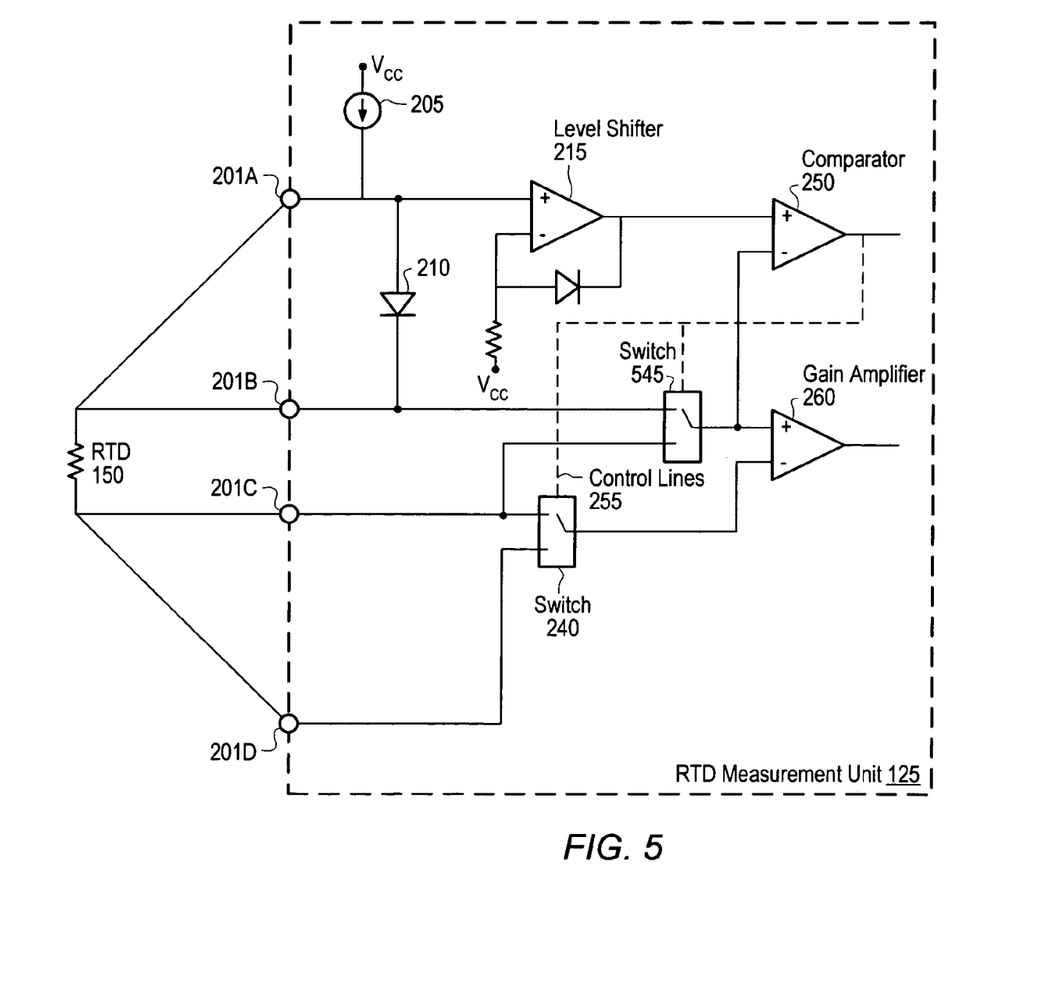
FIG. 5 is a circuit diagram of yet another embodiment of an RTD measurement unit.

FIG. 5 is a circuit diagram of yet another embodiment of RTD measurement unit 125. Components that correspond to those shown in the embodiments of FIGS. 2 and 3 are numbered identically for simplicity and clarity. In this embodiment, RTD measurement unit 125 may not include lead resistance compensation circuitry 280 connected between switch 240 and terminals 201C and 201D. Instead, RTD measurement unit 125 may include additional switching mechanisms between gain amplifier 260 and terminals 201B and 201C. For instance, as illustrated in the embodiment of FIG. 5, RTD measurement unit 125 may include switch 545.

In this embodiment, if a 3-wire configuration is detected (as described above), the comparator 250 automatically configures the processing circuitry (i.e., gain amplifier 260) to operate in a 3-wire configuration mode. More specifically, comparator 250 controls the state of switch 240 and switch 545 via control line 255 to configure the processing circuitry to operate in a 3-wire configuration mode. In the 3-wire configuration mode, comparator 250 places switch 240 and switch 545 in a second (lower) position to connect terminals 201D and 201C to gain amplifier 260. In this configuration, the lead resistance error associated with the leads connected to terminals 201D and 201C is measured. After measuring the lead resistance error, switches 240 and 545 are changed to a first (upper) position to connect terminals 201C and 201B to gain amplifier 260 and take an initial RTD measurement. The switching may be controlled by hardware or software. A corrected RTD reading may then be calculated by subtracting the two measurements, e.g., using software.

In the depicted embodiment of FIG. 5, if a 4-wire configuration is detected (as described above), the comparator 250 automatically configures the processing circuitry (i.e., gain amplifier 260) to operate in a 4-wire configuration mode. More specifically, comparator 250 places switch 240 and switch 545 in a first (upper) position to connect terminals 201C and 201B to gain amplifier 260 and take an RTD measurement.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An RTD measurement device comprising:
    detection circuitry configured to detect whether an RTD coupled to the RTD measurement device via a plurality of wire connections includes a 3-wire configuration or a 4-wire configuration by detecting a voltage drop across a resistive element coupled between a first terminal and a second terminal of the RTD measurement device; and
    processing circuitry configured to process one or more readings from the RTD;
    wherein, in response to the detection circuitry detecting a voltage drop across the resistive element that is above a predetermined threshold, the detection circuitry is operable to configure the processing circuitry to operate in a 3-wire configuration mode;
    wherein, in response to the detection circuitry detecting a voltage drop across the resistive element that is below the predetermined threshold, the detection circuitry is operable to configure the processing circuitry to operate in a 4-wire configuration mode.

2. The RTD measurement device of claim 1, further comprising a switching mechanism coupled to the detection circuitry, wherein the detection circuitry is operable to control the switching mechanism for configuring the processing circuitry to operate in either a 3-wire configuration mode or a 4-wire configuration mode based on the detected RTD configuration.

3. The RTD measurement device of claim 2, further comprising a resistive element coupled between a first terminal and a second terminal of the RTD measurement device, wherein the detection circuitry includes a comparator, wherein a first input terminal of the comparator is coupled to the first terminal of the RTD measurement device and a second input terminal of the comparator is coupled to the second terminal of the RTD measurement device.

4. The RTD measurement device of claim 3, wherein the processing circuitry includes lead resistance compensation circuitry and a conditioning device, and the switching mechanism includes a first switch, wherein a first input terminal of the lead resistance compensation circuitry is coupled to a third terminal of the RTD measurement device, and a second input terminal of the lead resistance compensation circuitry is coupled to a fourth terminal of the RTD measurement device, wherein a first input terminal of the conditioning device is coupled to the second input terminal of the RTD measurement device, and a second input terminal of the conditioning device is coupled to the first switch, wherein the first switch is coupled to the third terminal of the RTD measurement device and to an output terminal of the lead resistance compensation circuitry.

5. The RTD measurement device of claim 4, wherein, in response to detecting a 4-wire configuration, the detection circuitry is operable to configure the first switch in a first position to connect the third terminal of the RTD measurement device to the conditioning device.

6. The RTD measurement device of claim 5, wherein, in response to detecting a 3-wire configuration, the detection circuitry is operable to configure the first switch in a second position to connect the lead resistance compensation circuitry to the conditioning device for correcting lead resistance errors.

7. The RTD measurement device of claim 6, wherein the resistive element comprises a diode.

8. The RTD measurement device of claim 6, wherein the resistive element comprises a first resistor and a second resistor, wherein the switching mechanism comprises the first switch and a second switch, wherein the second switch is coupled to a junction between the first and second resistors and to the second terminal of the RTD measurement device, wherein in response to detecting a 3-wire configuration, the detection circuitry is configured to close the second switch, and wherein in response to detecting a 4-wire configuration, the detection circuitry is configured to open the second switch.

9. The RTD measurement device of claim 1, wherein protection circuitry is coupled to the resistive element to provide over-voltage protection.

10. The RTD measurement device of claim 4, wherein the conditioning device comprises a gain amplifier.

11. The RTD measurement device of claim 1, further comprising an excitation source coupled to the first terminal of the RTD measurement device and to the resistive element.

12. The RTD measurement device of claim 1, wherein, in a 3-wire configuration mode, the processing circuitry is configured to measure a lead resistance error and an initial RTD reading, wherein a corrected RTD reading is derived based on the measured lead resistance error and the initial RTD reading.

13. The RTD measurement device of claim 12, wherein, in a 3-wire configuration mode, a corrected RTD reading is derived by subtracting the measured lead resistance error from the initial RTD reading.

14. The RTD measurement device of claim 1, configured to communicate information indicating whether the RTD coupled to the RTD measurement device includes a 3-wire or 4-wire configuration to a management entity.

15. An apparatus comprising:
an RTD measurement device; and
an RTD coupled to the RTD measurement device via a plurality of wire connections;
wherein the RTD measurement device comprises:
detection circuitry configured to detect whether the RTD coupled to the RTD measurement device includes a 3-wire configuration or a 4-wire configuration by detecting a voltage drop across a resistive element coupled between a first terminal and a second terminal of the RTD measurement device; and
processing circuitry configured to process one or more readings from the RTD;
wherein, in response to the detection circuitry detecting a voltage drop across the resistive element that is above a predetermined threshold, the detection circuitry is operable to configure the processing circuitry to operate in a 3-wire configuration mode;
wherein, in response to the detection circuitry detecting a voltage drop across the resistive element that is below the predetermined threshold, the detection circuitry is operable to configure the processing circuitry to operate in a 4-wire configuration mode.

16. The apparatus of claim 15, wherein the RTD measurement device is configured to communicate information indicating whether the RTD includes a 3-wire or 4-wire configuration to a management entity.

17. The apparatus of claim 15, wherein the RTD measurement device further comprises a switching mechanism coupled to the detection circuitry, wherein the detection circuitry is operable to control the switching mechanism for configuring the processing circuitry to operate in either a 3-wire configuration mode or a 4-wire configuration mode based on the detected RTD configuration.

18. The apparatus of claim 17, further comprising a resistive element coupled between a first terminal and a second terminal of the RTD measurement device, wherein the detection circuitry includes a comparator, wherein a first input terminal of the comparator is coupled to the first terminal of the RTD measurement device and a second input terminal of the comparator is coupled to the second terminal of the RTD measurement device.

19. The apparatus of claim 18, wherein the processing circuitry includes lead resistance compensation circuitry and a conditioning device, and the switching mechanism includes a first switch, wherein a first input terminal of the lead resistance compensation circuitry is coupled to a third terminal of the RTD measurement device, and a second input terminal of the lead resistance compensation circuitry is coupled to a fourth terminal of the RTD measurement device, wherein a first input terminal of the conditioning device is coupled to the second input terminal of the RTD measurement device, and a second input terminal of the conditioning device is coupled to the first switch, wherein the first switch is coupled to the third terminal of the RTD measurement device and to an output terminal of the lead resistance compensation circuitry.

20. The apparatus of claim 19, wherein, in response to detecting a 4-wire configuration, the detection circuitry is operable to configure the first switch in a first position to connect the third terminal of the RTD measurement device to the conditioning device.

21. The apparatus of claim 20, wherein, in response to detecting a 3-wire configuration, the detection circuitry is operable to configure the first switch in a second position to connect the lead resistance compensation circuitry to the conditioning device for correcting lead resistance errors.

22. The apparatus of claim 21, wherein the resistive element comprises a diode.

23. The apparatus of claim 21, wherein the resistive element comprises a first resistor and a second resistor, wherein the switching mechanism comprises the first switch and a second switch, wherein the second switch is coupled to a junction between the first and second resistors and to the second terminal of the RTD measurement device, wherein in response to detecting a 3-wire configuration, the detection circuitry is configured to close the second switch, and wherein in response to detecting a 4-wire configuration, the detection circuitry is configured to open the second switch.

24. A method for operating an RTD measurement device, the method comprising:
detecting whether an RTD coupled to the RTD measurement device via a plurality of wire connections includes a 3-wire configuration or a 4-wire configuration by detecting a voltage drop across a resistive element;
processing one or more readings from the RTD;
wherein, in response to detecting a voltage drop across the resistive element that is above a predetermined threshold, configuring the RTD measurement device to operate in a 3-wire configuration mode;
wherein, in response detecting a voltage drop across the resistive element that is below the predetermined threshold, configuring the RTD measurement device to operate in a 4-wire configuration mode.

25. The method of claim 24, further comprising controlling a switching mechanism for configuring the RTD measurement device to operate in either a 3-wire configuration mode or a 4-wire configuration mode based on the detected RTD configuration.

* * * * *